United States Patent
Liao et al.

(10) Patent No.: US 11,168,198 B2
(45) Date of Patent: Nov. 9, 2021

(54) RECYCLED POLYESTER FIBER

(71) Applicant: NAN YA PLASTICS CORPORATION, Taipei (TW)

(72) Inventors: Te-Chao Liao, Taipei (TW);
Chung-Chi Su, Taipei (TW);
Chia-Sheng Lai, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 234 days.

(21) Appl. No.: 16/678,895

(22) Filed: Nov. 8, 2019

(65) Prior Publication Data

US 2020/0270416 A1   Aug. 27, 2020

(30) Foreign Application Priority Data

Feb. 22, 2019   (TW) .................................. 108106087

(51) Int. Cl.
| | | |
|---|---|---|
| *C08K 3/22* | (2006.01) | |
| *C08K 5/527* | (2006.01) | |
| *C08K 5/20* | (2006.01) | |
| *C08K 9/04* | (2006.01) | |
| *D01D 5/08* | (2006.01) | |
| *D01F 6/62* | (2006.01) | |
| *D01F 1/10* | (2006.01) | |
| *C08K 9/02* | (2006.01) | |

(52) U.S. Cl.
CPC .................. *C08K 3/22* (2013.01); *C08K 5/20* (2013.01); *C08K 5/527* (2013.01); *C08K 9/02* (2013.01); *C08K 9/04* (2013.01); *D01D 5/08* (2013.01); *D01F 1/10* (2013.01); *D01F 6/62* (2013.01); *C08K 2003/2241* (2013.01); *C08K 2201/005* (2013.01)

(58) Field of Classification Search
CPC . C08K 3/22; C08K 5/20; C08K 5/527; C08K 9/02; C08K 9/04; C08K 2003/2241; C08K 2201/005; D01F 5/08; D01F 1/10; D01F 6/62

See application file for complete search history.

(56) References Cited

FOREIGN PATENT DOCUMENTS

| | | | |
|---|---|---|---|
| CN | 100473764 C | 4/2009 | |
| CN | 101993525 A | 3/2011 | |
| CN | 102465350 A | 5/2012 | |
| CN | 101864067 B | 2/2013 | |
| CN | 104797648 A | 7/2015 | |
| CN | 104975373 | * 10/2015 | ............... D01F 6/92 |
| CN | 106752113 A | 5/2017 | |
| CN | 108035012 A | 5/2018 | |
| CN | 108396404 B | 6/2019 | |
| JP | 8199428 A | 8/1996 | |
| JP | 11217492 A | 8/1999 | |
| JP | 3247101 B2 | 1/2002 | |
| JP | 2005179877 A | 7/2005 | |
| JP | 200895228 A | 4/2008 | |
| JP | 200997105 A | 5/2009 | |
| JP | 2014101612 A | 6/2014 | |

OTHER PUBLICATIONS

English machine translation of CN 104975373. (Year: 2015).*

* cited by examiner

*Primary Examiner* — John E Uselding
(74) *Attorney, Agent, or Firm* — Li & Cai Intellectual Property (USA) Office

(57) ABSTRACT

A recycled polyester fiber is provided. The recycled polyester fiber is made of a raw material by melt spinning. The raw material includes 95.0 wt % to 99.99 wt % recycled polyester pellet formed from recycled bottle chip and 0.01 wt % to 5.0 wt % titanium dioxide slurry. Based on the total weight of the titanium dioxide slurry, the titanium dioxide slurry includes 20 wt % to 50 wt % bio-oil acting as carrier, 50 wt % to 80 wt % titanium dioxide powder, 0.1 wt % to 5 wt % dispersant, 0.01 wt % to 3 wt % antioxidant, and 0.001 wt % to 0.1 wt % dye.

12 Claims, No Drawings

RECYCLED POLYESTER FIBER

CROSS-REFERENCE TO RELATED PATENT APPLICATION

This application claims the benefit of priority to Taiwan Patent Application No. 108106087, filed on Feb. 22, 2019. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a recycled polyester fiber, and more particularly to a recycled polyester fiber produced by recycled bottle chip and titanium dioxide slurry. By adjusting a color of the titanium dioxide slurry, the recycled polyester fiber formed from the titanium dioxide slurry can have a color meeting product requirements.

BACKGROUND OF THE DISCLOSURE

Recently, consumers are placing more and more emphasis on the wear comfort of textile products, such as heat-insulation and cooling, moisture absorbing and quick drying, thermal retention, antisepsis and deodorization, and anti-static effects of the textile product. Therefore, various types of functional fibers have been progressively developed. Furthermore, the market for polyester yarn with anti-UV function is continuingly expanding due to the requirement for outdoor sports and the global warming effect.

For the high transmittance of the polyester fiber, the polyester fiber has to be treated by a dull finish process before fabrication so as to manufacture an opaque polyester textile or reduce the transmittance of the polyester textile. The addition of the titanium dioxide is a well-known technology which can not only dull the transmittance but also provide an additional anti-UV function.

In the disclosure of Patent Publication Number CN101864067B, the polyester fiber with anti-UV function is manufactured by adding titanium dioxide powder in the polycondensation process of polyester. However, disadvantages of the method are that the titanium dioxide powder may aggregate for poor dispersibility and the addition of the titanium dioxide powder may induce dust phenomenon.

In the disclosure of Patent Application Number CN101993525A, the full-dull polyester fiber is also manufactured by adding titanium dioxide slurry in the polycondensation process of polyester. Although the possibility of aggregation of the titanium dioxide in the method can be decreased, the rate of polymerization should be noted.

As for the method for manufacturing the recycled polyester fiber containing titanium dioxide from recycled polyester chip, the Patent Publication Number CN100473764C discloses that the titanium dioxide masterbatch is blended in the recycled polyester during the step of extruded granulation and that the recycled polyester fiber can be obtained by melting and spinning the recycled polyester containing the titanium dioxide. The method is beneficial for production but different sources of recycled bottle chip will result in different colors of recycled polyester pellet. Once the polyester pellet is fabricated, the color of the polyester pellet is difficult to be adjusted effectively and quickly.

SUMMARY OF THE DISCLOSURE

In response to the above-referenced technical inadequacies, the present disclosure provides a semi-dull or full-dull recycled polyester fiber. The semi-dull or full-dull recycled polyester fiber is manufactured by using the recycled polyester bottle chip and the titanium dioxide slurry, which has a color meeting consumer demands.

In one aspect, the present disclosure provides a recycled polyester fiber, and more particularly to a semi-dull recycled polyester fiber. The recycled polyester pellet formed from the recycled bottle chip is melted and then is spun to manufacture the recycled polyester fiber with physical properties and a color meeting product requirements.

The concentration of the dye in the titanium dioxide slurry can be adjusted according to the color difference of the recycled bottle chip so as to obtain the semi-dull or the full-dull recycled polyester fiber containing the titanium dioxide which conforms to a required standard for the color difference.

In one aspect, the recycled polyester fiber is made of a raw material by melt spinning, the raw material including 95.0 wt % to 99.99 wt % recycled polyester pellet formed from the recycled bottle chip and 0.01 wt % to 5.0 wt % titanium dioxide slurry. Based on the total weight of the titanium dioxide slurry, the titanium dioxide slurry includes:

(a) 20 wt % to 50 wt % bio-oil with an iodine value ranging from 40 to 130;

(b) 50 wt % to 80 wt % titanium dioxide powder with a surface is modified by a modifier;

(c) 0.1 wt % to 5 wt % dispersant which includes at least one selected from the group consisting of acidic copolymer, acidic polyether, modified fatty acid, and phosphate polymer;

(d) 0.01 wt % to 3 wt % antioxidant which is selected from the group consisting of hindered phenol antioxidant and phosphite antioxidant; and (e) 0.001 wt % to 0.1 wt % dye which is inorganic dye, organic dye, or pigment.

In certain embodiments, the bio-oil includes: soybean oil, grape seed oil, coconut oil, palm oil, palm kernel oil, olive oil, peanut oil, sunflower oil, wheat germ oil, almond oil, castor oil, sesame oil, canola oil, or any combination thereof, but is not limited thereto. Preferably, the bio-oil can be canola oil.

In certain embodiments, the dispersant is selected from the group consisting of: acidic copolymer, acidic polyether, modified fatty acid, and phosphate polymer. Preferably, the dispersant can be modified fatty acid.

In certain embodiments, the antioxidant is selected from the group consisting of: hindered phenol antioxidant and phosphite antioxidant. Preferably, the antioxidant can be bis(2,6-di-tert-butyl-4-methylphenyl)pentaerythritol diphosphite.

These and other aspects of the present disclosure will become apparent from the following description of the embodiment taken in conjunction with the following drawings and their captions, although variations and modifications therein may be affected without departing from the spirit and scope of the novel concepts of the disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

The recycled polyester fiber of the present disclosure is made of a raw material. The raw material includes 95.0 wt % to 99.99 wt % the recycled bottle chip and 0.01 wt % to 5.0 wt % the titanium dioxide slurry. After spinning, the recycled polyester fiber has physical properties and a color meeting product requirements. Specifically, "L value" representing the lightness according to JIS Z8729 of the recycled polyester fiber is larger than 70, and "b value" representing Blue/Yellow value according to JIS Z8729 of the recycled polyester fiber ranges from −1.0 to 3.2.

The concentration of the dye in the titanium dioxide slurry can be adjusted according to the color difference of the recycled bottle chip so as to obtain the recycled polyester fiber containing titanium dioxide which conforms to a required standard for the color difference. The viscosity of the titanium dioxide slurry of the present disclosure ranges from 3000 cps to 15000 cps. The fineness of the titanium dioxide slurry is smaller than 5 μm. The weight loss of the titanium dioxide slurry under thermogravimetric analysis at 300° C. is smaller than 5%.

The titanium dioxide slurry contains an inorganic powder with good thermal stability. The inorganic powder can be anatase titanium dioxide with a particle size being smaller than 1 μm. The titanium dioxide powder can be selected from the group consisting of: SA-1 manufactured by SAKAI CHEMICAL INDUSTRY CO., LTD., TA300 manufactured by FUJI CHEMICAL INDUSTRIES CO., LTD., and hombitan®MCT-120 manufactured by VENATOR MATERIALS PLC. The amount of the titanium dioxide powder in the titanium dioxide slurry is 1 wt % to 80 wt %. Preferably, the amount of the titanium dioxide powder in the titanium dioxide slurry is 70 wt % to 80 wt %.

The bio-oil of the present disclosure includes at least one of: soybean oil, grape seed oil, coconut oil, palm oil, palm kernel oil, olive oil, peanut oil, sunflower oil, wheat germ oil, almond oil, castor oil, sesame oil, or canola oil, but is not limited thereto. Preferably, the bio-oil can be canola oil.

The dispersant of the present disclosure is selected from the group consisting of: acidic copolymer, acidic polyether, modified fatty acid, and phosphate polymer. Preferably, the dispersant can be modified fatty acid.

The antioxidant of the present disclosure is selected from the group consisting of: hindered phenol antioxidant and phosphite antioxidant. Preferably, the antioxidant can be bis(2,6-di-tert-butyl-4-methylphenyl)pentaerythritol diphosphite.

The dye of the present disclosure can be inorganic dye, organic dye, or pigment. Specifically, the dye can be oracet®blue 690, oracet®blue 700FA, oracet®blue 720, oracet®blue 780FE, polysynthren blue RLS, or polysynthren blue RBL. Preferably, the dye can be polysynthren blue RBL.

The method for preparing the titanium dioxide slurry includes steps below.

The bio-oil is added in a stirring tank. Based on the total weight of the titanium dioxide slurry, 1 wt % to 10 wt % modified fatty acid acting as the dispersant is added in the stirring tank and then the stirring tank is stirred at a rotation speed of 1000 rpm for 30 minutes. Subsequently, 0.1 wt % to 2 wt % bis(2,6-di-tert-butyl-4-methylphenyl)pentaerythritol diphosphite acting as antioxidant and polysynthren blue RBL acting as dye are progressively added in the stirring tank, and then the stirring tank is stirred at a rotation speed of 3000 rpm for 60 minutes. Finally, the titanium dioxide powder is added.

The titanium dioxide slurry is grinded and dispersed by a three-roll-mills grinder for many times at a temperature of 25° C. to 100° C. so as to uniformly disperse the titanium dioxide powder. Preferably, the titanium dioxide slurry is grinded and dispersed at a temperature of 40° C. to 80° C. The grinded titanium dioxide slurry is further filtrated by a filter bag with an aperture size of 10 μm.

The method for manufacturing the recycled polyester pellet includes steps below.

When the recycled polyester bottle chip is fed in a twin-screw extruder, the filtrated titanium dioxide slurry is simultaneously fed in a side inlet of the twin-screw extruder. Therefore, the recycled polyester pellet containing the titanium dioxide is produced. An exhaust vent is formed on the twin-screw extruder and a vacuum pump is disposed on the twin-screw extruder. Therefore, various organic impurities can be removed completely via exhaust.

The method for manufacturing the recycled polyester fiber includes steps below.

The recycled polyester pellet is melted and forms a melt. The melt is passed through a filtrating grid and metal sand to remove the solid impurities. After being weighed by a gear pump, the melt is fed in a spinning box for spinning at a temperature of 230° C. to 290° C. The recycled polyester fiber produced after spinning is cooled and oiled. The recycled polyester fiber is taken up at high rotation speed to obtain partially oriented yarn (POY) or fully drawn yarn (FDY).

The specific method for manufacturing the recycled polyester fiber is illustrated below. A raw material containing 95.0 wt % to 99.99 wt % the recycled polyester pellet made of recycled bottle chip and 0.01 wt % to 5.0 wt % the titanium dioxide slurry is prepared. The raw material is melted and then spun to form the recycled polyester fiber. Based on the total weight of the titanium dioxide slurry as 100 wt %, the titanium dioxide slurry includes:

(a) 20 wt % to 50 wt % bio-oil with an iodine value ranging from 40 to 130; preferably, the iodine value of the bio-oil is 110;

(b) 50 wt % to 80 wt % titanium dioxide powder; wherein the titanium dioxide powder is anatase titanium dioxide powder; the particle size of the titanium dioxide powder is smaller than 1 μm; and a surface of the titanium dioxide powder is modified by a modifier so that the titanium dioxide powder can be dispersed in the recycled polyester fiber easily;

(c) 0.1 wt % to 5 wt % dispersant which includes at least one selected from the group consisting of acidic copolymer, acidic polyether, modified fatty acid, and phosphate polymer; preferably, the dispersant is modified fatty acid;

(d) 0.01 wt % to 3 wt % antioxidant which is selected from the group consisting of hindered phenol antioxidant and phosphite antioxidant; preferably, the antioxidant is bis(2,6-di-tert-butyl-4-methylphenyl)pentaerythritol diphosphite; and (e) 0.001 wt % to 0.1 wt % dye which is inorganic dye, organic dye, or pigment; the dye is selected from the group consisting of: oracet®blue 690, oracet®blue 700FA, oracet®blue 720, oracet®blue 780FE, polysynthren blue RLS, and polysynthren blue RBL; preferably, the dye can be polysynthren blue RBL.

Examples below are provided for illustration of the embodiments.

EXAMPLES 1 and 2

The titanium dioxide slurry A1 of Example 1 and the titanium dioxide slurry A2 of Example 2 are respectively prepared according to the components shown in Table 1. The properties of the titanium dioxide slurry are also shown in Table 1.

The recycled polyester fiber containing the titanium dioxide is manufactured according the raw material shown in Table 2. The polyester shown in Table 2 is recycled bottle chip.

The properties of the recycled polyester fiber are shown in Table 2.

TABLE 1 components and properties of the titanium dioxide slurry

| | | Titanium dioxide slurry (wt %) | |
|---|---|---|---|
| Components | | A1 | A2 |
| Bio-oil | Canola oil | 23.899 | 23.899 |
| Titanium dioxide powder | SA-1 (SAKAI CHEMICAL) | — | 75 |
| | TA300 (FUJI CHEMICAL) | 75 | — |
| Dispersant | Modified fatty acid | 1 | 1 |
| Dye | Polysynthren blue RBL | 0.001 | 0.001 |
| Antioxidant | RC PEP 36*[1] | 0.1 | 0.1 |
| Physical properties | | | |
| Viscosity (cps, 25° C.) | | 5500 | 4800 |
| Fineness | | <5 μm | <5 μm |

*[1] RC PEP 36 represents bis(2,6-di-tert-butyl-4-methylphenyl)pentaerythritol diphosphite.

TABLE 2 components of the raw material for manufacturing the recycled polyester fiber containing titanium dioxide and properties of the recycled polyester fiber

| | Raw material | Example 1 | Example 2 |
|---|---|---|---|
| Polyester | Recycled bottle chip | 99.627 wt % | 99.627 wt % |
| Titanium dioxide slurry | A1 | 0.373 wt % | — |
| | A2 | — | 0.373 wt % |
| Properties measured according to JIS Z8729 | | | |
| Color | L | 75.5 | 73.4 |
| | a | −3.31 | −3.28 |
| | b | 0.51 | 1.43 |

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A recycled polyester fiber made of a raw material by melt spinning; wherein the raw material includes 95.0 wt % to 99.99 wt % recycled polyester pellet formed from recycled bottle chip and 0.01 wt % to 5.0 wt % titanium dioxide slurry, characterized in that, based on the total weight of the titanium dioxide slurry, the titanium dioxide slurry includes:

(a) 20 wt % to 50 wt % bio-oil with an iodine value ranging from 40 to 130;

(b) 50 wt % to 80 wt % titanium dioxide powder with a surface modified by a modifier; (c) 0.1 wt % to 5 wt % dispersant which includes at least one selected from the group consisting of acidic copolymer, acidic polyether, modified fatty acid, and phosphate polymer;

(d) 0.01 wt % to 3 wt % antioxidant which is selected from the group consisting of hindered phenol antioxidant and phosphite antioxidant; and (e) 0.001 wt % to 0.1 wt % dye which is inorganic dye, organic dye, or pigment.

2. The recycled polyester fiber according to claim 1, wherein the recycled polyester fiber is partially oriented yarn or fully drawn yarn.

3. The recycled polyester fiber according to claim 1, wherein a viscosity of the titanium dioxide slurry ranges from 3000 cps to 15000 cps.

4. The recycled polyester fiber according to claim 1, wherein a fineness of the titanium dioxide slurry is smaller than 5 μm.

5. The recycled polyester fiber according to claim 1, wherein a weight loss of the titanium dioxide slurry under thermogravimetric analysis at 300° C. is smaller than 5%.

6. The recycled polyester fiber according to claim 1, wherein "L value" representing lightness according to JIS Z8729 of the recycled polyester fiber is larger than 70.

7. The recycled polyester fiber according to claim 1, wherein "b value" representing Blue/Yellow value according to JIS Z8729 of the recycled polyester fiber ranges from −1.0 to 3.2.

8. The recycled polyester fiber according to claim 1, wherein the iodine value of the bio-oil is 110.

9. The recycled polyester fiber according to claim 1, wherein the titanium dioxide powder is anatase titanium dioxide powder and a particle size of the titanium dioxide powder is smaller than 1 μm.

10. The recycled polyester fiber according to claim 1, wherein the dispersant of the titanium dioxide slurry is modified fatty acid.

11. The recycled polyester fiber according to claim 1, wherein the antioxidant of the titanium dioxide slurry is bis(2,6-di-tert-butyl-4-methylphenyl)pentaerythritol diphosphite.

12. The recycled polyester fiber according to claim 1, wherein the dye of the titanium dioxide slurry is polysynthren blue RBL.

\* \* \* \* \*